US009633466B2

(12) United States Patent
Tu et al.

(10) Patent No.: US 9,633,466 B2
(45) Date of Patent: Apr. 25, 2017

(54) LOW LATENCY INK RENDERING PIPELINE

(71) Applicant: MICROSOFT TECHNOLOGY LICENSING LLC, Redmond, WA (US)

(72) Inventors: Xiao Tu, Redmond, WA (US); Krishnan Menon, Redmond, WA (US); Fei Xiong, Redmond, WA (US); Sung Hong, Redmond, WA (US); David Walker Duhon, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/500,997

(22) Filed: Sep. 29, 2014

(65) Prior Publication Data

US 2016/0093087 A1 Mar. 31, 2016

(51) Int. Cl.
*G06F 3/0354* (2013.01)
*G06F 3/041* (2006.01)
(Continued)

(52) U.S. Cl.
CPC ........ *G06T 15/005* (2013.01); *G06F 3/03545* (2013.01); *G06F 3/041* (2013.01);
(Continued)

(58) Field of Classification Search
CPC ..... G06F 3/03545; G06F 3/041; G06F 3/0416
See application file for complete search history.

(56) References Cited

U.S. PATENT DOCUMENTS 7,016,055 B2    3/2006 Dodge et al.
7,352,366 B2    4/2008 Dresevic et al.
(Continued)

FOREIGN PATENT DOCUMENTS

WO    2005029391 A1    3/2005
WO    2005045574 A2    5/2005

OTHER PUBLICATIONS

Henzen, et al., "Sketching with a Low-latency Electronic Ink Drawing Tablet", In Proceedings of the 3rd International Conference on Computer Graphics and Interactive Techniques in Australasia and Southeast Asia, Nov. 29, 2005, 10 pages.
(Continued)

*Primary Examiner* — Jeffrey Chow
(74) *Attorney, Agent, or Firm* — Shook, Hardy & Bacon L.L.P.

(57) ABSTRACT

Systems and methods are provided for improving the latency for display of ink during user creation of ink content with a stylus, mouse, finger (or other touch input), or other drawing device for tracing a desired location for ink content in a display area. In order to reduce or minimize the time for display of ink content created by a user using a stylus/mouse/touch input/other device, a separate ink rendering process thread can be used that operates within the operating system and in parallel to other application threads. When it is desired to create ink content within an application, user interactions corresponding to creation of ink content can be handled by the separate ink rendering process thread. This can avoid potential delays in displaying ink content due to an application handling other events in a process flow.

20 Claims, 7 Drawing Sheets

(51) Int. Cl.
*G06T 15/00* (2011.01)
*G09G 5/395* (2006.01)
*G06F 9/54* (2006.01)

(52) U.S. Cl.
CPC .............. *G06F 3/0416* (2013.01); *G06F 9/54* (2013.01); *G09G 5/395* (2013.01)

(56) References Cited

U.S. PATENT DOCUMENTS

| | | | |
|---|---|---|---|
| 8,130,226 B2 | 3/2012 | Brunner et al. | |
| 8,203,527 B2 | 6/2012 | Low et al. | |
| 8,416,197 B2 | 4/2013 | Feng et al. | |
| 2005/0088420 A1* | 4/2005 | Dodge | G06F 3/038 345/173 |
| 2006/0274057 A1 | 12/2006 | Van Ness et al. | |
| 2010/0277505 A1 | 11/2010 | Ludden et al. | |
| 2011/0310118 A1 | 12/2011 | Asmi et al. | |
| 2013/0201112 A1 | 8/2013 | Large et al. | |
| 2014/0143692 A1 | 5/2014 | Wigdor et al. | |
| 2014/0168096 A1 | 6/2014 | Bathiche et al. | |
| 2015/0077355 A1* | 3/2015 | McCanny | G06F 3/0416 345/173 |

OTHER PUBLICATIONS

"What's new for XAML and DirectX interop in Windows 8.1", Published on: Nov. 19, 2013, http://blogs.windows.com/buildingapps/2013/11/19/whats-new-for-xaml-and-directx-interop-in-windows-8-1/, 12 pages.
"RealTimeStylus Reference", Retrieved on: Aug. 14, 2014, http://msdn.microsoft.com/en-us/library/windows/desktop/ms701683(v=vs.85).aspx, 1 page.
International Search Report with Written Opinion dated Dec. 9, 2015 in Application No. PCT/US2015/052755, 11 pages.
"Second Written Opinion Issued in PCT Application No. PCT/US2015/052755", Mailed Date: Aug. 26, 2016, 9 Pages.
"International Preliminary Report on Patentability Issued in PCT Application No. PCT/US2015/052755", Mailed Date: Dec. 20, 2016, 10 Pages.

* cited by examiner

FIGURE: COMPONENT RELATIONSHIPS

LOW LATENCY INK RENDERING PIPELINE

BACKGROUND

A tablet computing device (or a similar type of embedded device) often contains a touchscreen that allows a user to enter data into the device. Data entry by the user may be done using a finger, a mouse, a stylus (or pen), or such. Input from the pen (or finger) to the device is called "ink."

Ink is digitized to allow it to be processed and manipulated by the computing device and displayed. This typically is performed by sending out the digitized ink to the operating system on the device, having the processor process the ink, and then sending the processed ink to a graphics card. The graphics card then renders the ink (which is the effect of the user's action) on a monitor or display.

One deficiency of current ink rendering techniques is the latency introduced. Pens and fingers tend to be fast and virtually instantaneous while the rendering of the ink tends to lag. In fact, the entire ink rendering process can introduce a latency that can be on the order of anywhere between 70 to 200 milliseconds or even greater. This latency in ink rendering can make for a slow and awkward user experience.

In particular, this latency is an undesirable effect in that is breaks the perceptive barrier of manipulating an object directly. Of course these are mostly perceived in situations where there is a co-located experience. In other words, when the input and the output are co-located with each other (such as writing with a stylus on a tablet computing device or a touchscreen), the latency effect is greatest.

SUMMARY

Systems and methods are provided for improving the latency for display of ink during user creation of ink content with a stylus, mouse, finger (or other touch input), or other drawing device for tracing a desired location for ink content in a display area. In order to reduce or minimize the time for display of ink content created by a user using a stylus/mouse/touch input/other device, a separate ink rendering process thread can be used that operates within the operating system and in parallel to other application threads. When it is desired to create ink content within an application, user interactions corresponding to creation of ink content can be handled by the separate ink rendering process thread. This can avoid potential delays in displaying ink content due to an application handling other events in a process flow. Because the separate ink rendering process thread is in communication with the application, the ink content rendered by the separate ink rendering process can still be rendered using the context of the application. This can allow the ink content to be displayed to a user with a substantially similar appearance to the appearance the ink content can have after transfer of the ink content to the corresponding application.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
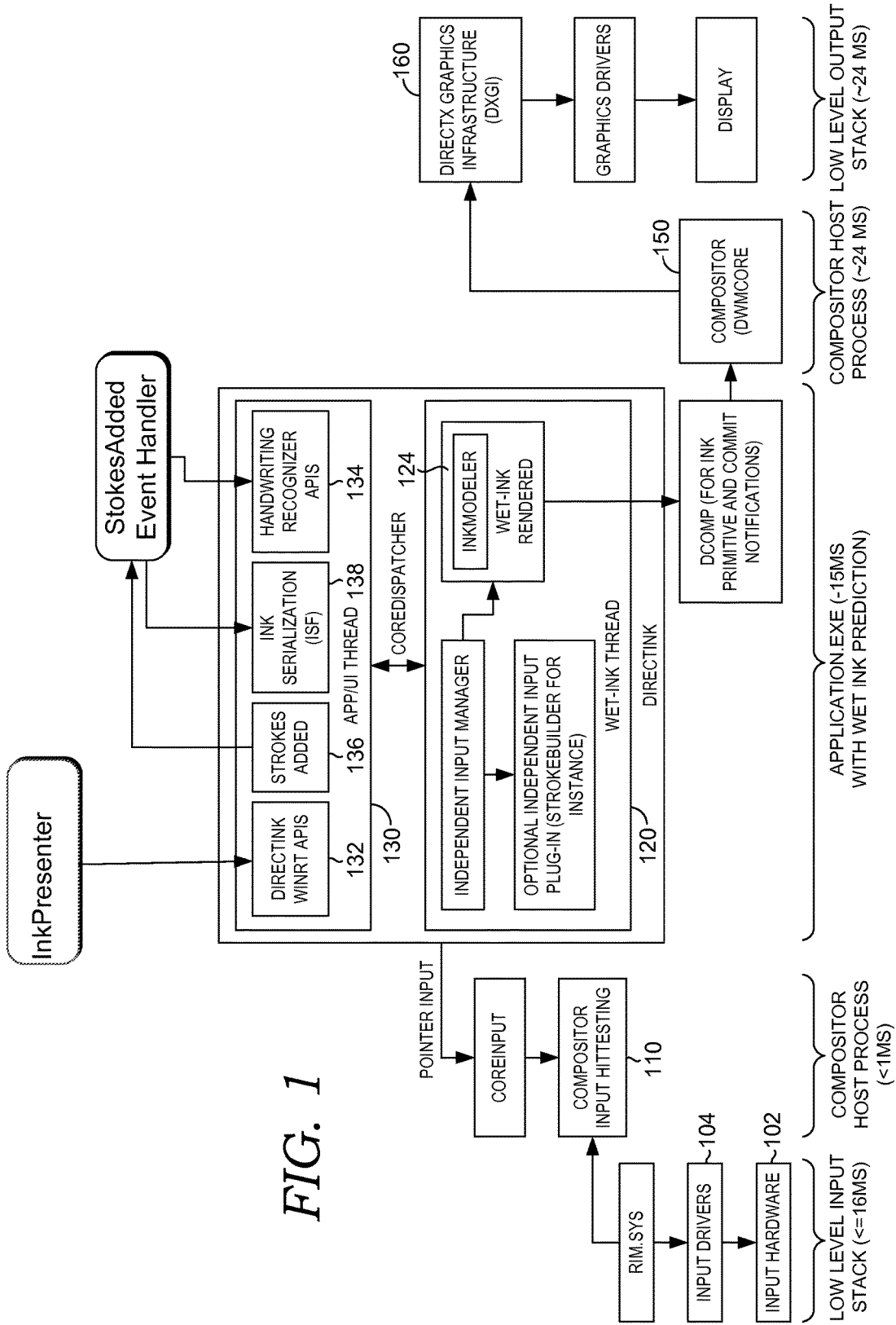
FIG. 1 schematically shows a flow diagram for a relationship between components for rendering wet ink content generated by a user.

In various aspects, systems and methods are provided for improving the latency for display of ink during user creation of ink content with a stylus, mouse, finger (or other touch input), or other drawing device for tracing a desired location for ink content in a display area. In order to reduce or minimize the time for display of ink content created by a user using a stylus/mouse/touch input/other device, a separate ink rendering process thread can be used that operates within the operating system and in parallel to other application threads. When it is desired to create ink content within an application, user interactions corresponding to creation of ink content can be handled by the separate ink rendering process thread. This can avoid potential delays in displaying ink content due to an application handling other events in a process flow. Because the separate ink rendering process thread is in communication with the application, the ink content rendered by the separate ink rendering process can still be rendered using the context of the application. This can allow the ink content to be displayed to a user with a substantially similar appearance to the appearance the ink content can have after transfer of the ink content to the corresponding application.

In various aspects, the systems and methods described herein can also allow new ink content created by a user to be displayed continuously during the transition of the handling of the ink content between process threads. When the creation of a given portion of new ink content is considered completed, the rendering of the completed content can be transferred to the process thread for the corresponding application. Since the creation of the particular portion of ink content is completed, the latency difficulties for new ink content are no longer of concern. As a result, further rendering can be performed by the process thread of the corresponding application with a reduced or minimized concern for latency in display of the completed content. In order to further improve the user experience, the transfer of display of the completed content from the ink rendering thread to the corresponding application process thread can be synchronized. This can allow the content to be displayed in a substantially continuous manner while eliminating the time period where both process threads attempt to display the ink content. Aspects of the invention can also prevent a situation where neither process is attempting to display ink content. In other words in an aspect of the invention, one or the other process can be displaying ink content, but not both simultaneously.

One of the difficulties with rendering ink content created by a user is displaying the ink content sufficiently quickly so that the user's actions appear to result in display of the ink content. It has previously been determined that users can perceive delays in responding to user actions for creation of ink content that are as small as about 50 milliseconds or less. When a delay in display of ink content being created by a user is visible, the delay can disrupt the user experience as the content creation may no longer have the sensation of creating ink using a physical pen on a writing surface. Unfortunately, attempting to display ink content using the process thread for an application where the ink content is created can lead to undesirable latency periods. This is due to the fact that a typical application does not have an ability to prioritize actions related to ink content within the application process thread relative to other actions performed by the application.

As an alternative, the rendering of the ink content can be entirely separated out from the operating system. This can allow for display of new ink content created by a user using hardware and/or software features that by-pass the operating system, and instead directly display the new ink in the display area. After creation of the new ink content, the new ink content is then passed to the operating system, where any modifications to the display features can be applied so that the ink content is rendered in the context provided by a corresponding application. While this type of method can reduce latency in display of new ink content, the initial display of the new ink content may differ from the final rendering of the content.

In some aspects, a benefit of the systems and methods described herein is improving the performance of the computer in order to reduce the latency for display of ink content. Such an improvement can also lead to an improved user experience during creation of ink content.

In various aspects, the systems and methods described herein can allow a user to create ink input using an input device, such as a stylus, a touch interface for receiving touch input, a mouse, or another device that can control the movement of a cursor within a display area. A user's desire to create ink content can be determined or detected based on a context for a user's actions. An action context can be defined that corresponds to actions for creation of ink content. An input context for a user action can then be detected and compared with the action context to determine whether an input action is an ink creation action.

One type of context can be the nature of the input device itself. This can be referred to as a modal context, which can be detected based on the interaction of a stylus with a surface; the interaction of a finger or another shape with a surface for touch input; the movement of a cursor icon (or other cursor identifier) using a mouse; and/or any other convenient device.

A second type of context can be a location context. Optionally, the entire display area of a display, a touch surface, an input pad, or another type of user interface can be ready for receipt of ink content at any time. In this type of option, a user's actions can be detected as ink creation actions based on just the modal context and/or based on other types of context different from a location context. Alternatively, one or more regions in a user interface (such as in the display area of a user interface) can be identified as regions where ink content can be received. In this type of option, a user action is detected as an ink creation action based on a combination of the modal context and the location context. The regions for potentially receiving ink content can be pre-defined by an operating system for a device; pre-defined by an application running on a device; or created based on definitions for one or more regions by a user.

A third type of context can be an ink creation context. One option can be to interpret any user action having a selected modal context and/or location context as an ink creation action. Alternatively, determining that a user action is an ink creation action can be dependent on detecting a specific type of user action, such as a single tap/click or double tap/click with an input device to initiate creation of ink content. Such specified actions can correspond to an ink creation context. It is noted that the ink creation context can vary depending on whether a user has previously initiated ink creation. For example, additional actions by a user, such as movement of the input device or a cursor, can be interpreted as ink creation actions after ink creation has been initiated and until an action is detected that ends the ink creation, such as lifting the device away from the input surface.

Aspects of the invention are not limited to the three contexts describe above. Other contexts are possible.

Based on the modal context, the location context, the action context, and/or any other types of context used for determination of whether a user action is an ink creation action, the user input actions can be tested against the context to determine whether the user actions are ink creation actions. If the input actions are ink creation actions, the input actions can be routed to a separate process thread, such as an ink rendering thread, for rendering the ink content being created by the user. Actions which do not satisfy the context conditions can be passed to the application and/or the operating system for processing in the conventional process thread for handling user input actions. Although the testing of input actions can cause a brief delay to determine the nature of the input actions, substantial reduction in latency can be achieved (such as tens of milliseconds) based on using a separate process thread for rendering ink content as it is created by the user. This type of testing can sometime be referred to as "hit testing." In one aspect of the invention, hit testing does not occur. Instead, ink is generated based on the contact and displayed without hit testing (and without the resulting delay). If the input turns out not to satisfy an inking context, then the ink process is canceled and the displayed wet ink removed.

One potential concern with handling ink content in a separate ink rendering process thread from an underlying application is that the new ink content must eventually be transferred to (or synchronized with) the underlying application. In various aspects, systems and methods are provided that allow this transfer to occur while reducing or minimizing changes in the displayed ink content (including temporary loss of display) and/or reducing or minimizing dual display of content by both process threads. This can provide benefits both in performance of a device and in the resulting user experience.

DEFINITIONS

In the discussion below, examples of the systems and methods according to the invention may be exemplified using an operating environment based on a Microsoft™ operating environment. Additionally, certain terms are used for ease of reference in describing the various aspects. The following explicit definitions are provided to aid in understanding of the various aspects.

Wet Ink: Ink that is rendered while an ink stroke is in progress, that is, while the contact (pen, for example) has not yet been lifted off the surface. In various aspects, wet ink can be converted to or replaced with semi-dry ink or dry ink. The conversion process may continue for a period of time after the pen has been lifted off the surface. The rendered ink remains wet ink until replaced with either semi-dry ink or dry ink. In various aspects, wet ink is rendered on the separate ink rendering thread.

Dry Ink: Ink that is rendered or re-rendered after an ink stroke is completed or ink that is rendered from ink data loaded from a source (persisted ink content) other than input.

Semi-dry Ink: Ink in an intermediate layer pending synchronization to the dry ink layer. In various aspects, semi-dry ink can be rendered on the separate ink rendering process thread.

Wet/Dry Synchronization: A mechanism to allow dry ink to be rendered and made visible on the dry ink thread and wet ink to be cleared on the ink thread in a manner that can ensure that a) wet ink is not still visible when corresponding dry ink becomes visible; b) wet ink does not disappear before corresponding dry ink becomes visible; and c) the ink thread is never blocked from processing input and rendering further wet ink.

Host: The underlying application or framework within which a portion of new ink content is created by a user.

Host Thread: The process thread for the underlying application or user interface.

Ink Rendering Thread: A background thread (preferably created within the operating system) on which input of selected types is received and processed to render wet ink. Note that this thread is shared by all instances for rendering of wet ink within a process.

Dry Ink Thread: The thread on which ink data is delivered to the rendering component or thread. In one aspect, the host thread is the rendering thread, but other options are possible including a dedicated ink rendering thread.

Input Re-Direction: A mechanism to register with the input stack to have input matching specified characteristics (such as input for creation of wet ink) automatically routed to a specified thread instead of, by default, the UI thread. In various aspects, the specified characteristics can correspond to a modality of input, such as use of a stylus, finger (or other touch input), or other input device suitable for creation of wet ink. In various aspects, the specified characteristics can further specify the use of such an input device within a portion of a user interface that has been defined for receiving wet ink input.

InkManager: A Windows Runtime class. It provides properties and methods to manage the input, manipulation, and processing (including handwriting recognition) of one or more ink objects.

D2D: Direct2D. A hardware-accelerated, immediate-mode, 2-D graphics API that provides high performance and high-quality rendering for 2-D geometry, bitmaps, and text. It is designed to support interop with other rendering technology such as Direct3D.

D3D: Direct3D. A low-level API for drawing primitives with the rendering pipeline or performing parallel operations with the compute shader. It hides different GPU implementations behind a coherent abstraction and is designed to drive graphics-specific processors.

DComp: DirectComposition. A Windows component that enables high-performance bitmap composition with transforms, effects, and animations. It can combine bitmaps from a variety of sources and leverage the Desktop Window Manager (DWM) for rendering to the screen.

DXGI: Microsoft DirectX Graphics Infrastructure. It manages low-level tasks that can be independent of the Direct3D graphics runtime. It also provides a common framework for several versions of Direct3D.

Process Flow for Handling Ink Content

FIG. 1 shows an example of a process flow for rendering of wet ink content using a separate ink rendering process thread. In the process flow shown in FIG. 1, a user can use a hardware component, such as a mouse, stylus, pen, or a touch interface (for receiving touch input) to provide input actions for creating wet ink content. The input hardware 102 can pass this input to hardware drivers 104 and eventually to an input tester 110. The input tester can evaluate the context for the input actions, including the nature of the hardware and/or the location within a display associated with the input actions, to determine whether the input actions correspond to actions for creating wet ink content.

If the user actions correspond to creating wet ink content, the input actions are diverted to wet ink process thread 120. As shown in FIG. 1, wet ink process thread 120 handles only a limited number of actions, which can reduce or minimize the potential for delays in handling a wet ink rendering action. This is in contrast to the multiple types of actions handled by the general user interface and/or application process thread 130. For example, just in relation to handling of ink content, the user interface and/or application process thread 130 can: provide application program interfaces 132 for general display of ink content; provide application program interfaces 134 for additional processing of ink content, such as handwriting recognition; receive input 136 for when ink strokes have been added, so that the resulting ink content can be displayed; and handle display of previously created dry ink content 138, such as serialized ink content.

After receiving wet ink input, the wet ink process thread 120 can render 124 the wet ink content and pass the rendered content back to the graphics processing elements of the operating system, such as compositor 150. Eventually the rendered wet ink is passed to the hardware graphics display elements 160 for display to a user.

A system using a process flow as shown in FIG. 1 can provide a variety of advantages. For example, this type of process flow can provide low latency wet ink rendering that is independent of application/UI thread, i.e. input flows directly to a high priority background thread (Wet-Ink Thread shown in Error! Reference source not found.) and will never be blocked by UI/app thread activities. Optionally but preferably, the system can use wet Bezier algorithms that work well for default pen types, as well as prediction to reduce latency by 15 ms or more relative to a conventional system. Such a system can also be compatible with pressure modeling for altering ink characteristics. Additionally, based in part on the wet ink process thread being within the operating system, the wet ink process thread can render a pen cursor that matches the ink drawing attributes (color, shape, size, type etc.).

Figure 2:
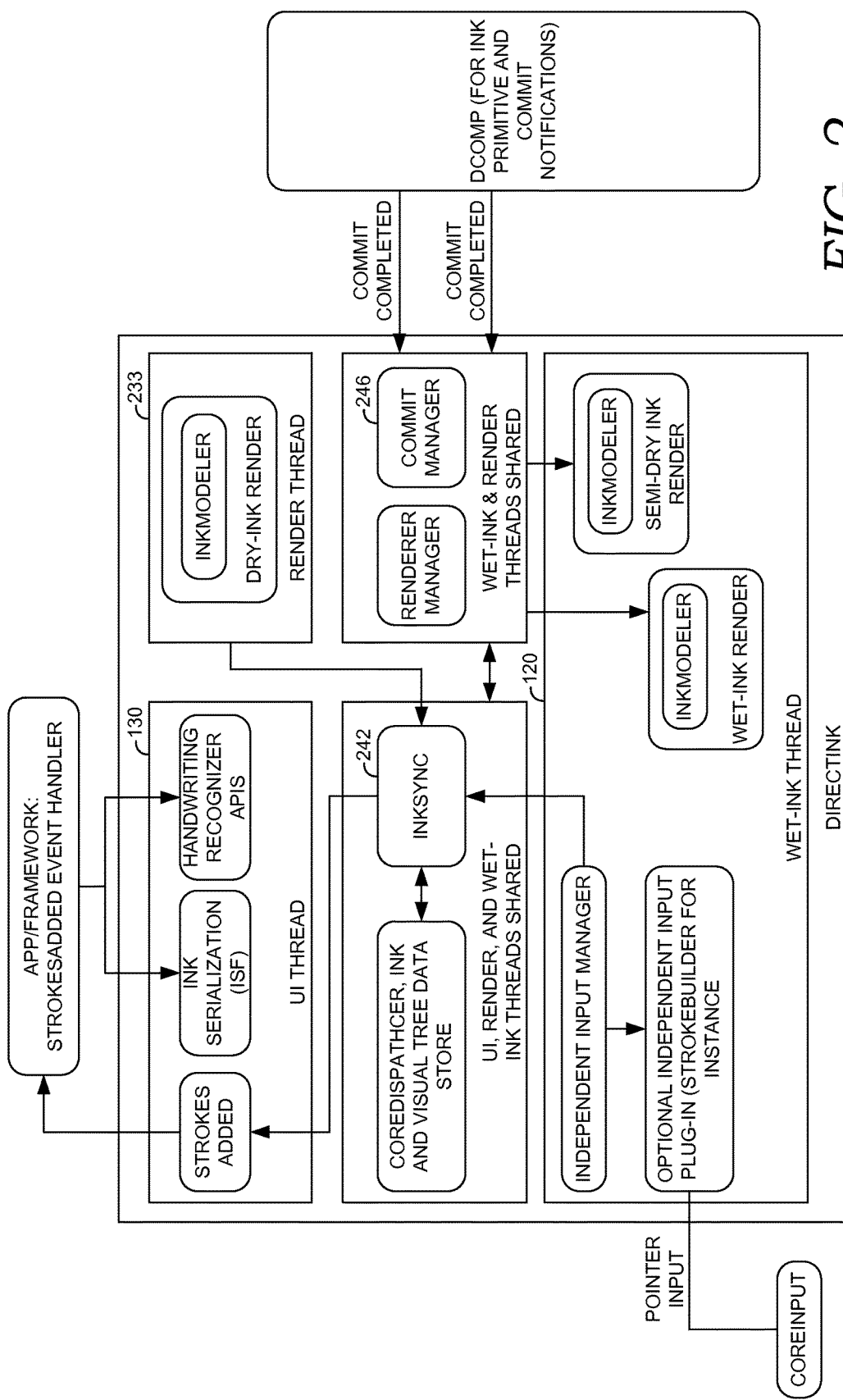
FIG. 2 schematically shows a flow diagram for a relationship between components for rendering various types of ink content.

FIG. 2 shows another process flow that includes process threads for display of both wet ink (i.e., ink during the process of creation by a user) and dry ink (i.e., ink content previously entered by the user and/or obtained from a data source). In the process flow in FIG. 1, ink content created by a user can be rendered by the wet-ink process thread after creation of the ink content is complete. The dry-ink content rendering in FIG. 1 corresponds to rendering of previously defined dry-ink content, such as content retrieved from a source file. In FIG. 2, additional flows are shown to allow for transfer of ink content created by a user from the wet-ink process thread to the user interface/application/other thread for rendering of dry-ink content.

In FIG. 2, wet-ink thread 120 can communicate with user interface thread 130 (and optional separate dry-ink rendering thread 233) via components that communicate with both threads. These components can include an InkSync component 242 that synchronizes transfer of wet ink from the wet-ink thread 120 to user interface thread 130. The components can also include commit manager 246 that provides verification to components that a transfer has been completed. For example, commit manager 246 can inform user interface thread 130 when a conversion from wet ink to intermediate ink (or semi-wet ink) has been completed by wet ink thread 120. Similarly, commit manager 246 can inform wet ink thread 120 when the user interface thread 130 has started rendering of a transferred dry ink content, so that wet ink thread 120 can stop rendering of the corresponding intermediate ink content.

Component Relationships

Figure 3:
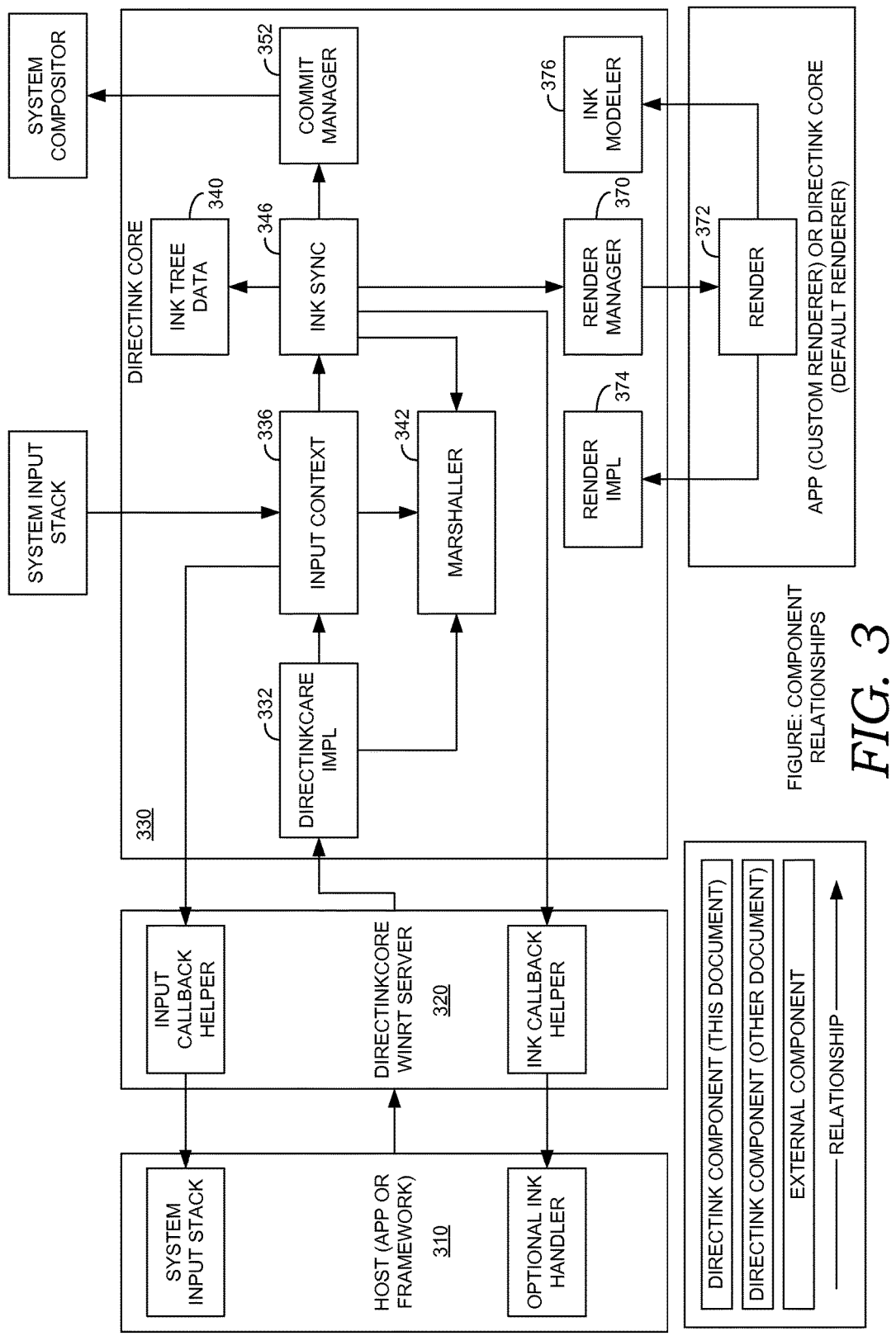
FIG. 3 schematically shows a flow diagram for a relationship between components for rendering ink content.

FIG. 3 shows relationships between various components that can be used for rendering of user created ink content (wet ink) as well as transfer of wet ink from a separate ink rendering thread to a process thread associated with an application. In FIG. 3, a host application 310 or other framework (including potentially an operating system) can communicate via one or more application programming interfaces 320 with an overall "DirectInk Core" module 330. The application programming interfaces 320 shown in FIG. 3 include input interfaces and ink handling interfaces. When input is received by the host 310 that is detected as wet ink input (or another type of input to be handled by the wet ink process thread), the input is passed into module 330.

The DirectInkCore Implement object 332 is a container object that creates and coordinates most of the other objects shown in module 330. The Marshaller 342 owns the ink thread and implements the mechanism for notifications between threads, isolating the notification mechanism from the other components. The Input Context object 336 is an input sink object that registers for input redirection and receives input on the ink thread. The Ink Sync object 346 is a synchronization engine that implements the mechanism for wet/dry ink synchronization. The Commit Manager 352 is a shared object that performs DComp Commits and isolates other components from the details of the DComp commit completion notification. The Render Manager 370 tracks renderer instances to be used for wet, semi-dry and dry layers and routes render requests to the appropriate renderer instance. Render Manager 370 can also create default renderer instances as required and manages custom renderer instances as required. Renderer 372 is a high-level renderer object. Renderer Implement 374 is a low-level renderer object that, given a surface/context, ink data and drawing attributes, performs the actual rendering. Ink Modeler 376 creates smooth Bezier segments from input, optionally with prediction.

The Ink Tree Data object 340 is a data object that creates and maintains a DComp visual sub-tree representing the ink sub-tree for a DirectInkCore instance along with associated ink data for the wet, semi-dry and dry layers. Additional description of using ink trees to organize and manage ink content can be found in U.S. Pat. No. 7,499,058. The content related to use and management of ink trees is explicitly incorporated herein by reference, along with the entirety of the reference.

Figure 4:
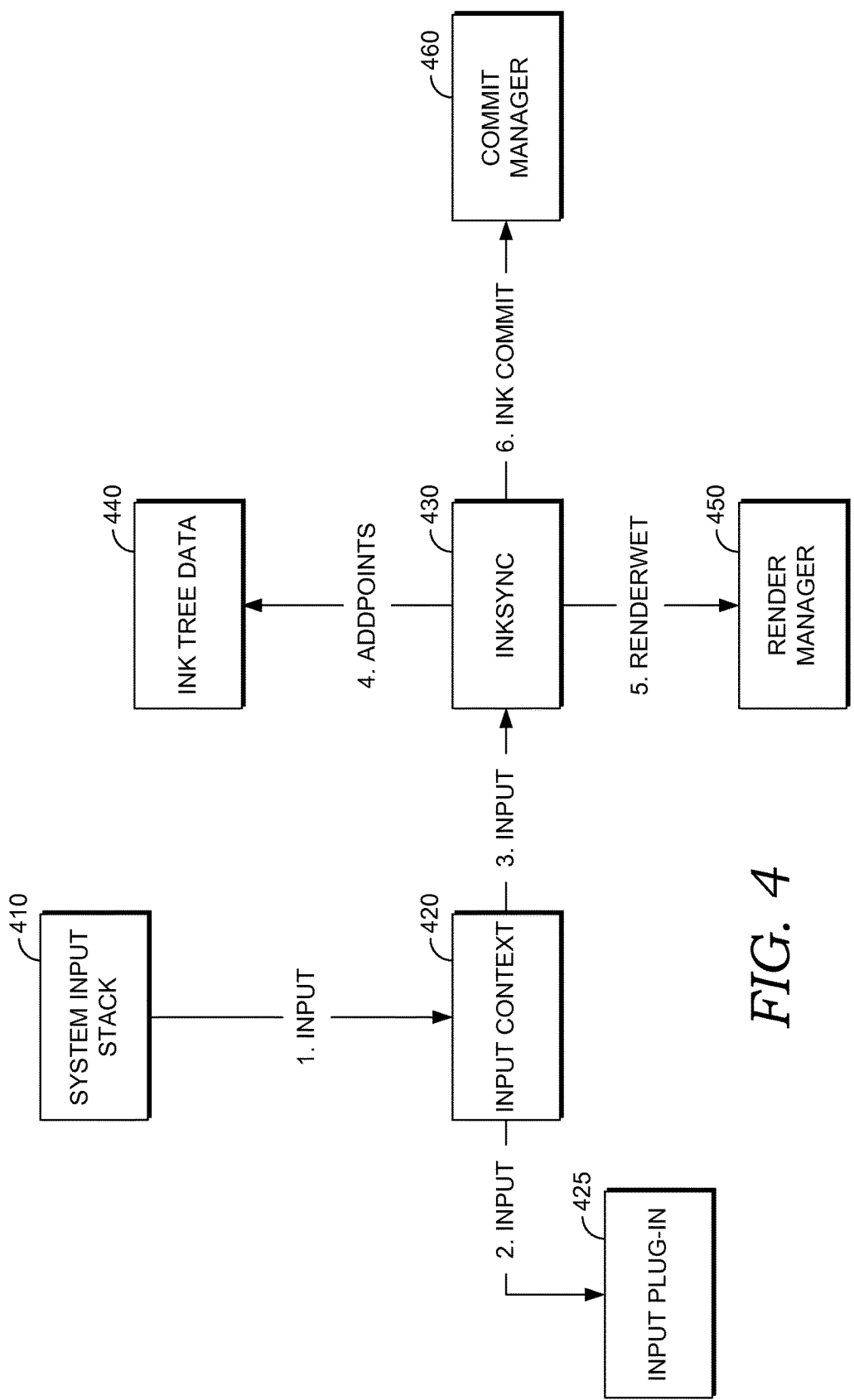
FIGS. 4-6 show process flows for rendering of various types of ink content.

FIG. 4 shows a data flow for handling the arrival of input corresponding to wet ink and the rendering of the wet ink input. In FIG. 4, input that is identified as being wet ink is delivered by system input stack 410 to input context component 420. The input can optionally be passed to any input plug-ins 425. The input is also passed to InkSync component 430. InkSync 430 can pass information to the InkTreeData component 440 that new wet ink content is being created. InkSync can also instruct the render manager 450 to render the wet ink. Finally, when entry of ink content is completed, InkSync 430 can notify commit manager 460.

Figure 5:
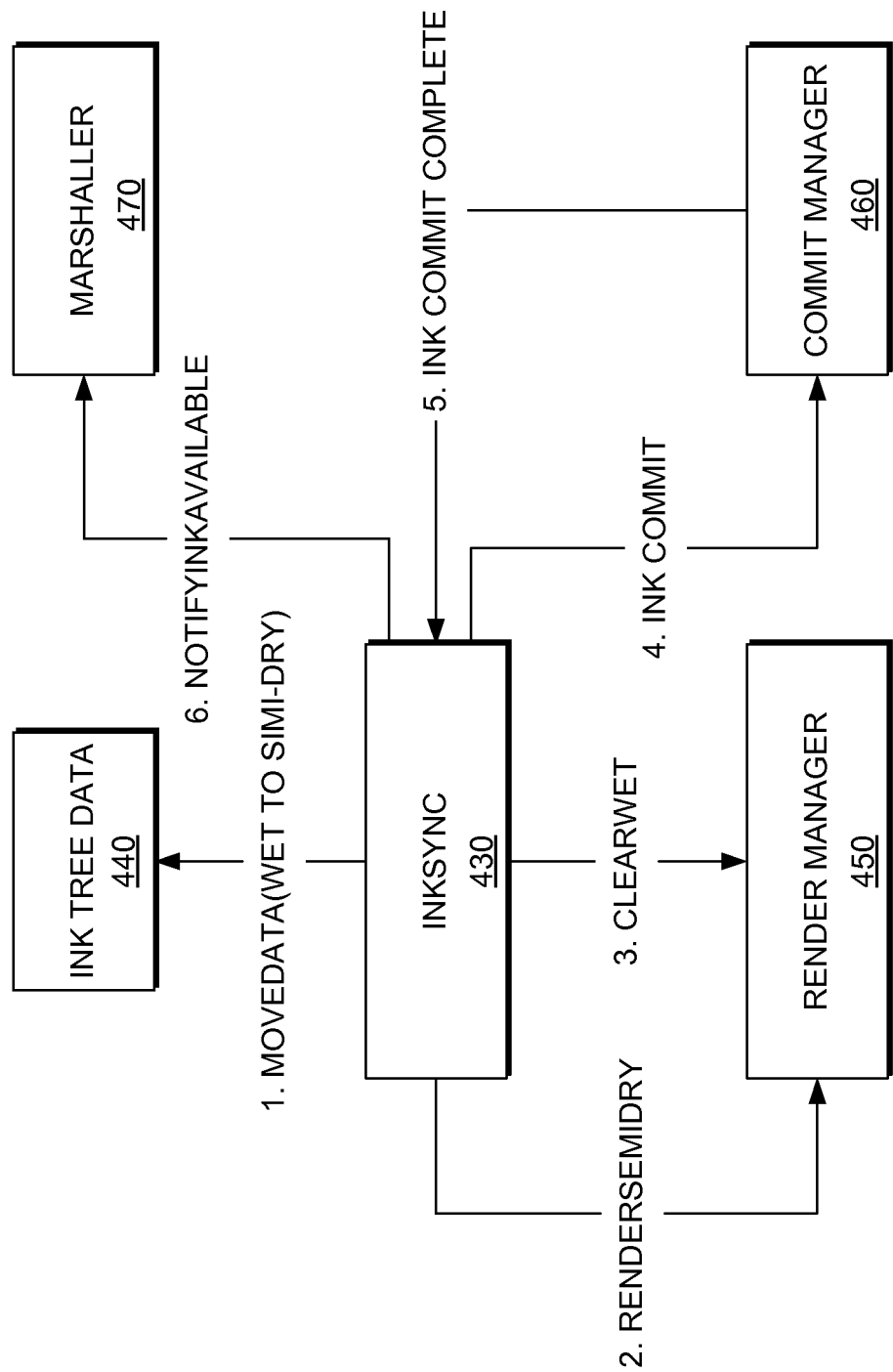

FIG. 5 shows a data flow for rendering of semi-dry or intermediate ink after the completion of entry of an ink content portion by a user. In FIG. 5, the data flow starts when Ink Sync component 430 notifies InkTreeData 440 that creation of an ink content portion has been completed, so the ink content portion can be moved from wet ink status to intermediate ink status. The render manager 450 can then receive instruction to render the completed portion of ink content using an intermediate or semi-dry ink renderer instance, allowing the wet ink renderer instance to be ready for another ink content creation event. After notifying the commit manager 460, the marshaller 470 can be passed a notification that ink is available for transfer to the dry-ink render process thread that is managed by the host or underlying application.

Figure 6:
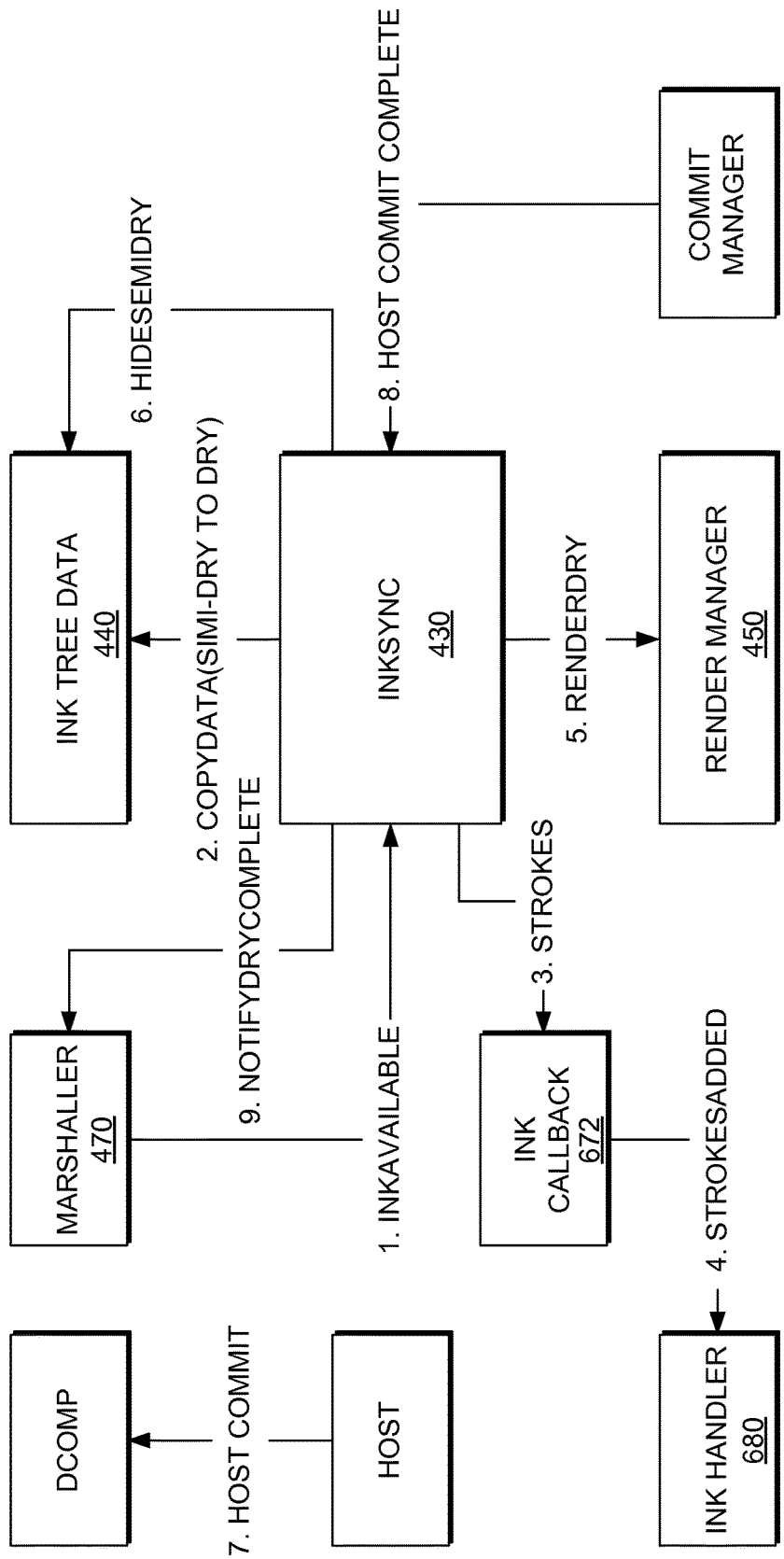

FIG. 6 shows a process flow for the (synchronized) transfer of ink from the wet ink process thread to the dry ink process thread. In FIG. 6, InkSync 430 receives an Ink Available signal from Marshaller 470. InkSync 430 then informs InkTreeData 440 to copy the ink content from semi-dry to dry status. The stroke information for rendering the ink as dry ink is passed using Ink Callback 672 to Ink Handler 680. The ink content is also passed to Render Manager 450 for rendering with a dry ink renderer instance. After this is completed, InkSync 430 notifies InkTreeData 440 that the semi-dry version of the ink content can be hidden, so that the wet ink thread no longer handle the ink content.

Figure 7:
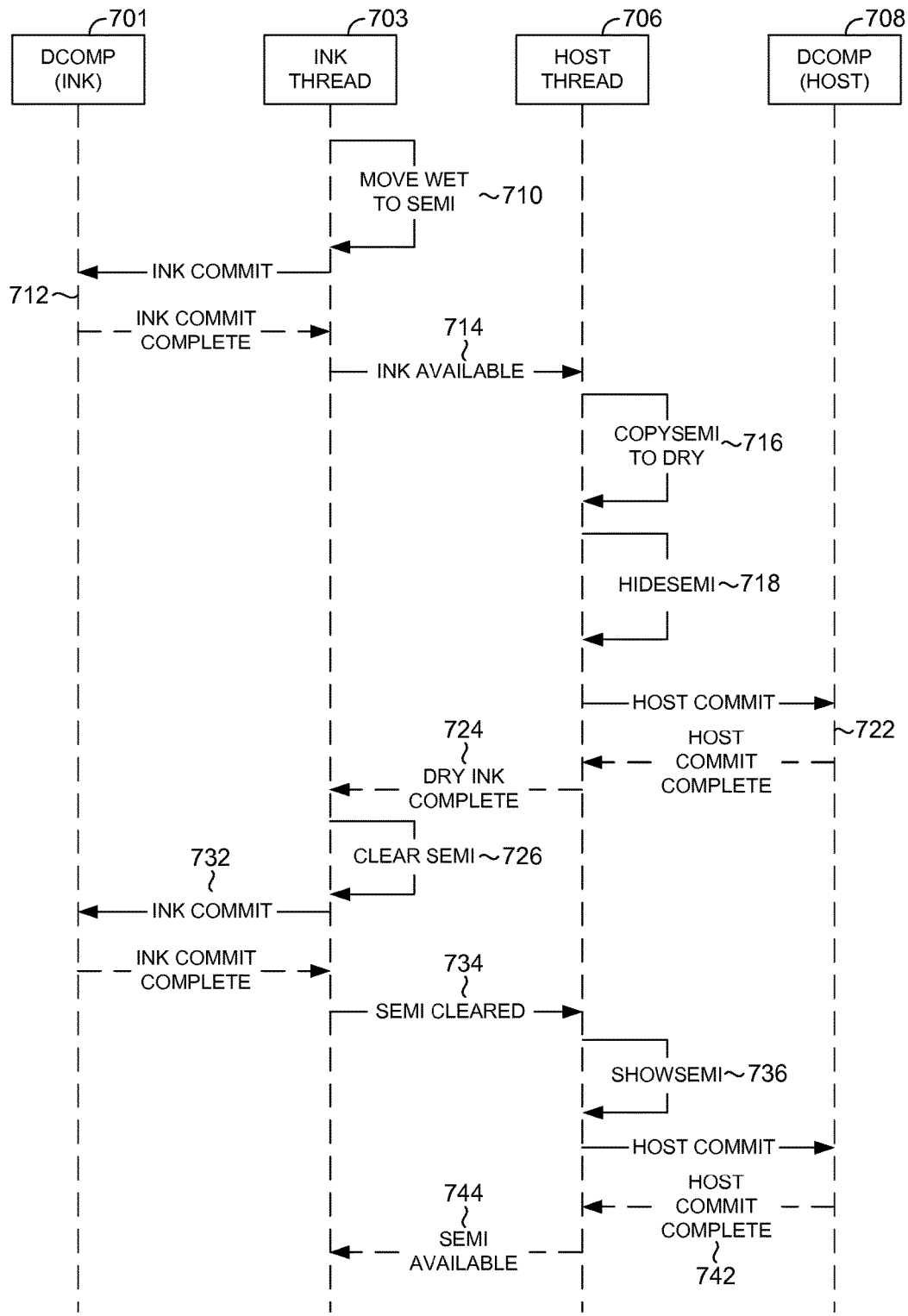
FIG. 7 shows a process communication flow diagram for transfer of ink content between process threads.

FIG. 7 shows a communication flow between the DComp instances for the wet ink rendering thread (ink) and for the dry ink rendering thread (host). The communication flow in FIG. 7 shows how the transfer of wet ink to dry ink can be synchronized to reduce or minimize the time where the dry ink thread and the wet ink thread both attempt to display ink content while avoiding discontinuities in the display of the ink content.

In FIG. 7, the Ink thread 703 initiates the calls by starting a move wet to semi-wet process 710. The DComp component 701 confirms with the Ink thread with commit calls 712. An InkAvailable call 714 is then passed to Host thread 706. Host thread 706 initiates a copy semi-dry to dry call 716 to move the data within the ink tree. After this copy is complete, a call 718 to hide the semi-dry data is also made. The semi-dry to dry transition is confirmed with Dcomp host thread 708 with commit calls 722. A call 724 is then returned to ink thread 703 that the transfer of semi-dry ink to dry ink is complete. The rendering of the semi-dry ink by the wet ink thread is then cleared 726, with commit calls 732 to confirm. A call 734 regarding the clearing of the semi-dry ink is then passed to Host thread 706.

Additional Examples

Having briefly described an overview of various embodiments of the invention, an exemplary operating environment suitable for performing the invention is now described. Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, and the like. The invention may also be practiced in distributed computing environments where tasks are performed by remote-processing devices that are linked through a communications network.

A suitable computing device may include a bus that directly or indirectly couples the following devices: memory, one or more processors, one or more presentation components, input/output (I/O) ports, I/O components, and a power supply. A bus represents what may be one or more busses (such as an address bus, data bus, or combination thereof). Although the various components are described as individual components for the sake of clarity, in reality, delineating various components is not so clear, and metaphorically, the lines would more accurately be grey and fuzzy. For example, one may consider a presentation component such as a display device to be an I/O component. Additionally, many processors have memory. Distinction is not made between such categories as "workstation," "server," "laptop," "hand-held device," "tablet," etc., as all are contemplated within the scope of "computing device."

Computer storage media includes volatile and nonvolatile, removable and non-removable media implemented in any method or technology for storage of information, such as computer-readable instructions, data structures, program modules, or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVDs) or other holographic memory, magnetic cassettes, magnetic tape, magnetic disk storage or other magnetic storage devices, or any other medium that can be used to encode desired data and that can be accessed by the computing device 100. In an embodiment, the computer storage media can be selected from tangible computer storage media like flash memory. These memory technologies can store data momentarily, temporarily, or permanently. Computer storage does not include, and excludes, communication media. Computer storage media is non-transitory and excludes propagated data signals.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared and other wireless media.

Memory can include computer-readable media in the form of volatile and/or nonvolatile memory. The memory may be removable, non-removable, or a combination thereof. Exemplary hardware devices include solid-state memory, hard drives, optical-disc drives, etc. A computing device can include one or more processors that read data from various entities such as the memory or the I/O components. The presentation component(s) present data indications to a user or other device. Exemplary presentation components include a display device, speaker, printing component, vibrating component, and the like.

The I/O ports can allow the computing device to be logically coupled to other devices including the I/O components, some of which may be built in. Illustrative components can include a microphone, joystick, game pad, satellite dish, scanner, printer, wireless device, etc. The I/O components can include components that receive one or more input types from a plurality of input types, such as touch input (e.g., touching or proximity to a display interface, as opposed to indirect movement on a display based on interaction with a keyboard or mouse), gesture input, haptic input, voice input, proximity input, interaction with a secondary input device such as the input devices identified above, or any other convenient type of input.

A computing device may include a radio. The radio transmits and receives radio communications. The computing device may be a wireless terminal adapted to received communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Embodiment 1

A method for rendering ink content on a display device, comprising: defining an action context for receiving ink input actions, the action context including at least a modal context; receiving, by an application, an input action, the input action having an input context; detecting the received input action as an ink creation action, the received input action being detected as an ink creation action based on the input context corresponding to the defined action context, the detected ink creation action corresponding to an ink content; directing the detected ink creation action to a wet-ink rendering process thread, the wet-ink rendering thread being different from an application processing thread for the application; rendering, by the wet-ink rendering thread, the ink content with a latency less than a latency threshold; and detecting an input action corresponding to an end of ink creation.

Embodiment 2

The method of Embodiment 1, further comprising: transferring the ink content from the wet-ink rendering thread to an application rendering thread, the application rendering thread being different from the wet-ink rendering thread and optionally being different from the application processing thread; rendering, by the application rendering thread, the transferred ink content; and removing the ink content rendered by the wet-ink rendering thread.

Embodiment 3

The method of Embodiment 2, wherein transferring the ink content from the wet-ink rendering thread to the application rendering thread comprises: converting the ink content, after detecting the input action corresponding to the end of ink creation, to an intermediate ink content; transferring the intermediate ink content to the application rendering thread; and synchronizing the rendering of the transferred intermediate ink content by the application rendering thread with the removing of the ink content rendered by the wet-ink rendering thread.

Embodiment 4

The method of any of the above embodiments, wherein the latency threshold is about 75 milliseconds or less, or about 60 milliseconds or less, or about 50 milliseconds or less.

Embodiment 5

The method of any of the above embodiments, wherein the modal context comprises an input mode of pen input, stylus input, touch input, mouse input, or a combination thereof.

Embodiment 6

The method of any of the above embodiments, wherein the defined action context further comprises a location context.

Embodiment 7

The method of Embodiment 6, wherein the location context comprises a region of a display area of a display device, the region comprising less than a total area of the display area.

Embodiment 8

The method of Embodiment 6 or 7, wherein the location context comprises a plurality of regions of a display area of a display device, or wherein the location context comprises a plurality of regions from a plurality of display areas.

Embodiment 9

The method of any of the above embodiments, wherein at least one of the input context and the action context further comprises one or more display properties for ink rendered by the wet-ink rendering thread.

Embodiment 10

The method of claim 9, further comprising: detecting a change in the one or more display properties for ink rendered by the wet-ink rendering thread during the rendering of the ink content by the wet-ink rendering thread; and rendering at least a portion of the ink content using the changed one or more display properties.

Embodiment 11

The method of Embodiment 10, wherein at least a portion of ink content rendered prior to detecting the change in the one or more display properties is rendered with the changed one or more display properties prior to detecting the input action corresponding to an end of ink creation.

Embodiment 12

The method of any of the above embodiments, wherein the action context further comprises an ink creation context.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A method for rendering ink content on a display device, comprising:
   defining an action context for receiving ink input actions;
   receiving, by an application, an input action, the input action having an input context;
   detecting the input action as an ink creation action because the input context satisfies criteria specified by the action context;
   directing the ink creation action to a wet-ink rendering thread, the wet-ink rendering thread being different from an application processing thread for the application that renders an application;
   rendering, by the wet-ink rendering thread, the ink creation action content with a latency less than a latency threshold to generate a wet ink content;
   outputting the wet ink content for display;
   detecting an additional input action corresponding to an end of ink creation;
   converting the wet ink content, after detecting the additional input action corresponding to the end of ink creation, to an intermediate ink content;
   transferring the intermediate ink content to the application rendering thread; and
   synchronizing the rendering of the intermediate ink content by the application rendering thread with the removing of the wet ink content rendered by the wet-ink rendering thread;
   transferring the ink creation action to an application processing thread;
   rendering, by the application processing thread, the ink creation action to generate a dry ink content; and
   removing from display the intermediate ink content rendered by the wet-ink rendering thread and outputting for display the dry ink content.

2. The method of claim 1, wherein the modal context comprises an input mode of pen input, stylus input, touch input, mouse input, or a combination thereof.

3. The method of claim 1, wherein the action context further comprises a location context.

4. The method of claim 3, wherein the location context comprises a region of a display area of the display device, the region comprising less than a total area of the display area.

5. The method of claim 3, wherein the location context comprises a plurality of regions of a display area of the display device.

6. The method of claim 3, wherein the location context comprises a plurality of regions from a plurality of display areas.

7. The method of claim 1, wherein at least one of the input context and the action context further comprises one or more display properties for the wet ink content rendered by the wet-ink rendering thread.

8. The method of claim 7, further comprising:
detecting that the one or more display properties have been updated to form a changed one or more display properties for the wet ink content rendered by the wet-ink rendering thread during the rendering of the ink creation action by the wet-ink rendering thread; and
rendering at least a portion of the ink creation action using the changed one or more display properties.

9. The method of claim 8, wherein at least a portion of the wet ink content rendered prior to detecting that the one or more display properties have been updated is rendered with the changed one or more display properties prior to detecting the additional input action corresponding to the end of ink creation.

10. The method of claim 1, wherein the action context further comprises an ink creation context.

11. One or more computer storage media containing computer-executable instructions that, when executed, provide a method for rendering ink content on a display device, comprising:
defining an action context for receiving ink input actions;
receiving, by an application, an input action, the input action having an input context;
detecting the input action as an ink creation action because the input context satisfies criteria specified by the action context;
directing the ink creation action to a wet-ink rendering thread, the wet-ink rendering thread being different from an application processing thread for the application;
rendering, by the wet-ink rendering thread, the ink creation action;
outputting the wet ink content for display;
detecting an additional input action corresponding to an end of ink creation;
converting the wet ink content, after detecting the additional input action corresponding to the end of ink creation, to an intermediate ink content;
transferring the intermediate ink content to the application rendering thread; and
synchronizing the rendering of the intermediate ink content by the application rendering thread with the removing of the wet ink content rendered by the wet-ink rendering thread;
transferring the ink creation action from the wet-ink rendering thread to an application processing thread;
rendering, by the application processing thread, the ink creation action to generate dry ink content; and
removing the intermediate ink content rendered by the wet-ink rendering thread and outputting the dry ink content for display.

12. The one or more computer storage media of claim 11, wherein the modal context comprises an input mode of pen input, stylus input, touch input, mouse input, or a combination thereof.

13. The one or more computer storage media of claim 11, wherein the location context comprises a region of a display area of the display device, the region comprising less than a total area of the display area.

14. The one or more computer storage media of claim 11, wherein the location context comprises a plurality of regions of a display area of the display device.

15. The one or more computer storage media of claim 11, wherein the location context comprises a plurality of regions from a plurality of display areas.

16. The one or more computer storage media of claim 11, wherein at least one of the input context and the action context further comprises one or more display properties for the wet ink content rendered by the wet-ink rendering thread.

17. One or more computer storage media containing computer-executable instructions that, when executed, provide a method for rendering ink content on a display device, comprising:
receiving, by an application, an input action, the input action having an input context;
detecting the input action as an ink creation action because the input context satisfies criteria specified by the action context, the ink creation action corresponding to an ink content;
directing the ink creation action to a wet-ink rendering thread, the wet-ink rendering thread being different from an application processing thread for the application;
rendering, by the wet-ink rendering thread, the ink creation action with a latency less than a latency threshold to generate a wet ink content;
outputting the wet ink content for display;
detecting an additional input action corresponding to an end of ink creation;
converting the wet ink content, after detecting the additional input action corresponding to the end of ink creation, to an intermediate ink content;
transferring the intermediate ink content to the application rendering thread; and
synchronizing the rendering of the intermediate ink content by the application rendering thread with the removing of the wet ink content rendered by the wet-ink rendering thread;
transferring the ink creation action from the wet-ink rendering thread to an application processing thread;
rendering, by the application processing thread, the ink creation action to generate a dry ink content; and
removing the intermediate ink content rendered by the wet-ink rendering thread and outputting for display the dry ink content.

18. The one or more computer-storage media of claim 17, wherein at least one of the input context and the action context further comprises one or more display properties for ink rendered by the wet-ink rendering thread.

19. The one or more computer-storage media of claim 17, wherein the modal context comprises an input mode of pen input, stylus input, touch input, mouse input, or a combination thereof.

20. The one or more computer-storage media of claim 17, wherein the wet ink content is rendered with characteristics provided by the application.

* * * * *